United States Patent
Brumm et al.

(10) Patent No.: US 7,822,013 B2
(45) Date of Patent: Oct. 26, 2010

(54) SYSTEM AND METHOD TO REDIRECT CALLS IN A TELECOMMUNICATIONS NETWORK

(75) Inventors: Thomas Brumm, Gauting-Königswiesen (DE); Robert Kresnik, Slovenska Bistrica (SI); Patrick Kleiner, München (DE); Udo Klotz, Neuried (DE); Norbert Löbig, Darmstadt (DE); Irena Romanski, Egling (DE); Walter Zinkl, Vienna (AT)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 2143 days.

(21) Appl. No.: 10/221,507

(22) PCT Filed: Jul. 16, 2001

(86) PCT No.: PCT/DE01/02657

§ 371 (c)(1),
(2), (4) Date: Jul. 16, 2003

(87) PCT Pub. No.: WO02/11412

PCT Pub. Date: Feb. 7, 2002

(65) Prior Publication Data

US 2004/0042447 A1    Mar. 4, 2004

(30) Foreign Application Priority Data

Jul. 31, 2000    (DE) ............................... 100 37 291

(51) Int. Cl.
*H04L 12/66*    (2006.01)
*H04M 3/00*    (2006.01)
*H04M 3/42*    (2006.01)
*H04M 7/00*    (2006.01)

(52) U.S. Cl. ................... 370/352; 370/401; 379/211.01; 379/221.01; 379/265.04

(58) Field of Classification Search ................. 370/352, 370/356, 353, 354, 401; 379/211.01, 221.01, 379/265.04
See application file for complete search history.

(56) References Cited

U.S. PATENT DOCUMENTS 4,414,621 A  *  11/1983  Bown et al. ................. 715/733

(Continued)

FOREIGN PATENT DOCUMENTS

EP    0928120 A2  *  7/1999

(Continued)

OTHER PUBLICATIONS

International Preliminary Examination Report for PCT/DE01/02657 dated Jul. 29, 2002.

*Primary Examiner*—Alpus H Hsu
(74) *Attorney, Agent, or Firm*—Laurence A. Greenberg; Werner H. Stemer; Ralph E. Locher

(57) ABSTRACT

The invention relates to a method for call diversion in a telecommunication network, comprising a data network (1), a voice network (2), for the transmission of speech, a network server (7), for the speech network (2) and a management server (6), for the data network (1). According to the invention, the management server is interrogated about the state of a call from the user terminal (8) to the data network (1) and where an error in said call occurs a call transfer to a stored address is carried out by the network server (7).

12 Claims, 1 Drawing Sheet

U.S. PATENT DOCUMENTS

| | | | | |
|---|---|---|---|---|
| 5,253,288 | A * | 10/1993 | Frey et al. | 379/221.03 |
| 5,754,630 | A * | 5/1998 | Srinivasan | 379/88.23 |
| 5,889,845 | A | 3/1999 | Staples et al. | |
| 6,049,602 | A * | 4/2000 | Foladare et al. | 379/265.04 |
| 6,141,413 | A * | 10/2000 | Waldner et al. | 379/88.17 |
| 6,219,413 | B1 * | 4/2001 | Burg | 379/215.01 |
| 6,374,302 | B1 * | 4/2002 | Galasso et al. | 709/238 |
| 6,400,812 | B1 * | 6/2002 | Svedberg et al. | 379/114.14 |
| 6,438,222 | B1 * | 8/2002 | Burg | 379/215.01 |
| 6,542,935 | B1 * | 4/2003 | Ishii | 709/245 |
| 6,650,619 | B1 * | 11/2003 | Schuster et al. | 370/230 |
| 6,704,282 | B1 * | 3/2004 | Sun et al. | 370/237 |
| 6,707,811 | B2 * | 3/2004 | Greenberg et al. | 370/352 |
| 6,714,793 | B1 * | 3/2004 | Carey et al. | 455/466 |
| 6,747,970 | B1 * | 6/2004 | Lamb et al. | 370/352 |
| 6,795,867 | B1 * | 9/2004 | Ma et al. | 709/240 |
| 6,895,002 | B2 * | 5/2005 | Shah et al. | 370/356 |
| 6,999,448 | B1 * | 2/2006 | Klein | 370/352 |

FOREIGN PATENT DOCUMENTS

EP      0 959 593 A2    11/1999

* cited by examiner

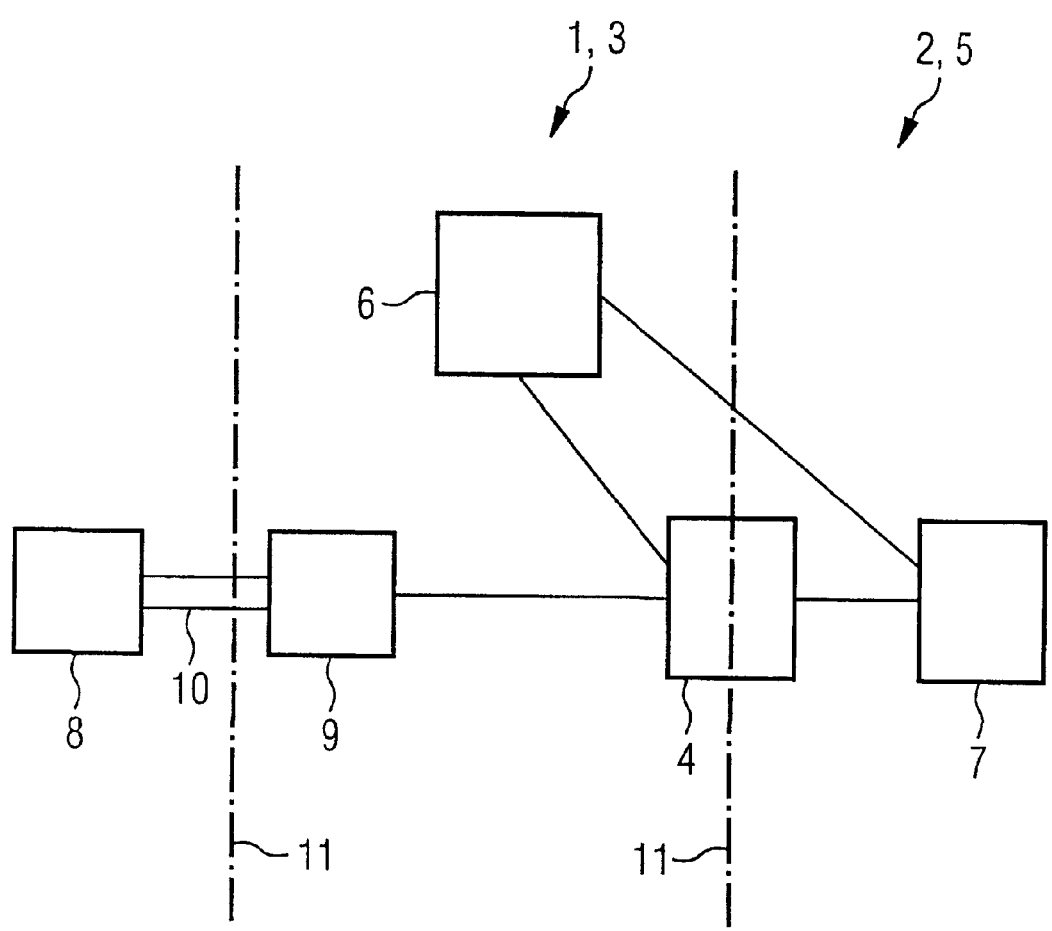

under this address of the data network. Telephone calls can be transmitted in the Internet or in IP-based networks using the H.323 standard. If the terminal device of the subscriber is not signed on, the problem arises that an incoming call in the voice network that is switched over to the data network through a gateway can get lost. Not even an answering machine can solve this problem since it also would have to be signed on. It is thus desirable in this case as well to reach a call redirect system.

SYSTEM AND METHOD TO REDIRECT CALLS IN A TELECOMMUNICATIONS NETWORK

CLAIM FOR PRIORITY

This application claims priority to International Application No. PCT/DE01/02657 as published in the German language on Feb. 7, 2002.

TECHNICAL FIELD OF THE INVENTION

This invention relates to a system and method to redirect calls in telecommunications networks, and in particular, to a system and method to redirect calls within a voice network that is connected to a data network where the call redirection occurs when a subscriber has not signed on (e.g. logged in) to the data network through a terminal device.

BACKGROUND OF THE INVENTION

In telecommunications networks that were originally conceived and further developed to provide voice connections, and which should be called voice networks, there are known call-switching service features that ensure that important calls are not lost. Thus, these voice networks, such as land line telephone networks, usually provide the service feature "redirect if busy" for the case that another connection is currently active with the called subscriber, or "redirect if there is no answer" if the called subscriber does not pick up the call, as well as "immediate call redirect" if the called subscriber would like all incoming calls to be redirected to another subscriber connection. Here, the call can be redirected to another subscriber connection in the same voice network or to another voice network connected to the first. Other possible destinations to which to redirect calls are to a recorded message or to an answering machine.

These possibilities described basically arise if a subscriber is connected to a voice network via a data network. Such a data network is, for example, a local computer network such as a Local Area Network (LAN) or the Internet. These networks had originally been developed for pure data transmission containing no spoken language, and thus do not initially provide the service features listed above. They are based on packet switching of data. Since the data transmission rates of these data networks have in the meantime reached very high levels, which are fundamentally suitable for voice transmission, processes were developed to also transmit voice, i.e., telephone calls over these types of networks as well. Thus, only a single network is required and not two parallel networks, the data network and the voice network.

An example of this is the use of IP-based data networks for voice transmission according to the H.323 standard. According to this standard, the following components are provided, among others: terminals, gateway and gatekeepers. Terminals are terminal devices connected to the data network. However, it is always necessary in these data networks that the subscriber signs on or logs in using these terminal devices. A gateway serves to convert the data protocols between the data network and the voice network. A gatekeeper is responsible for administering and controlling the user services as well as the network capacities in the data network operated under the H.323 standard. In particular, the gatekeeper performs the addressing of an incoming call in the data network. The directory number (telephone number) is converted into an address in the data network. In the gatekeeper, the information then exists indicating whether a terminal has signed on under this address of the data network. Telephone calls can be

SUMMARY OF THE INVENTION

The invention discloses a method with which an incoming call is redirected for a subscriber in the data network in case the subscriber is not signed on to the data network.

In one embodiment of the invention, there is a switching server which establishes that a call has come in for a subscriber in the data network. A telecommunications network includes a data network (packet network) and/or a voice network (e.g., land line network). Access to a data network is possible through the state "logged in." The telecommunications network has a switching server that determines whether an incoming call to a subscriber exists, and it has an administration server that recognizes the state of the subscriber as logged in/ not logged in.

In one aspect of the invention, an address for a call redirection for the subscriber is saved in the switching server or administration server. Then, the switching server transmits the subscriber address to the administration server of the data network. After a check is done as to whether a terminal device of the subscriber is signed on (logged in) to the data network, the administration server transmits the results of the check to the switching server. If the administration server transmits the result "not signed on," the call is redirected to the prescribed address through the switching server.

It is advantageous that the process can be implemented in a telecommunications network as a network with packet switching.

The address for a call redirect can be transmitted to the switching server by the administration server along with the result of the check.

It is preferable for the switching server to not perform call redirect if a maximum number of call redirects to be performed in series is exceeded.

It is advantageous for the process to be applied as a data network in the Internet or in a Local Area Network (LAN).

In another embodiment of the invention, a telecommunications network has at least one data network to which a subscriber has access when a terminal device of the subscriber has signed on (logged in) to it. At least one voice network is connected to the data network that is a suitable telecommunications network for voice transmission, and the subscriber obtains access to it via the data network. The voice network has a switching server that provides call redirects to other locations in the telecommunications network. An administration server of the data network serves to administer and control the user services and network capacities in the data network, and at least one address for a call redirect is saved in the switching server or administration server for the subscriber. The switching server has the ability to query the administration server to see if the subscriber's terminal device is signed on to the data network if the subscriber is called from the voice network. The switching server can redirect the call to a stored address if as a result of the query "not signed on" is transmitted. With a minimum of work and using existing switching means, a call redirect can therefore also be achieved in this case. This is particularly advantageous if the data network is a network with packet switching.

It is preferable to store the address for a call redirect in the administration server of the data network and to transfer it to the switching server with the results of the query.

Advantageously, the switching server can store a maximum number of call redirects that can be made in a series. In this way, multiple call redirects can be limited.

It is preferable for the packet network to be the Internet and for the administration server to be a gatekeeper. Likewise, the packet network can be a Local Area Network (LAN).

BRIEF DESCRIPTION OF THE DRAWINGS

With reference to the figures, embodiments of the invention are detailed and will be explained in more detail below.

FIG. 1 shows a diagram of a telecommunications network that has a data network and a voice network.

DETAILED DESCRIPTION OF THE PREFERRED EMBODIMENTS

FIG. 1 shows a schematic sketch of a telecommunications network that has a data network 1 and a voice network 2. In this example, the data network 1 is the Internet 3 and the voice network 2 is an arbitrary telephone network 5 as a land line network. The Internet 3 is connected to the telephone network 5 via a gateway 4 that converts the transport protocols. In forwarding calls according to the H.323 standard from the telephone network 5 to the Internet 3, the gatekeeper 6 exists as the administration server that serves to administer and control the user services and network capacities in the Internet 3. A switching server 7 in the telephone network 5 provides the service features of the telephone network 5 already known, such as call redirect, if a subscriber connection is busy or not reachable. The subscriber who now utilizes the availability of voice transmission via the Internet 3 is connected to the Internet 3 via a terminal device 8, wherein the terminal device 8 must be signed on, i.e., logged in. The sign-on in the Internet occurs through a server 9 of a service provider and is indicated by means of a double line 10. The sign-on of the telephone service is done in the gatekeeper (6). Two dashed separating lines 11 show the boundary between the Internet 3 and the telephone network 5 as well as between the Internet 3 and e terminal device 8.

If a call comes in for the subscriber at the switching server 7 originating from the telephone network 5, the server transmits the subscriber address to the gatekeeper 6 of the Internet 3. After checking whether the terminal device 8 of the subscriber is signed on (logged in) to the Internet 3, the gatekeeper transmits the results of the check to the switching server 7. In case no such sign-on 11 has occurred, the call is redirected to a prescribed address by the switching server 7. The maximum number of repeated call redirects can be limited in order to prevent multiple call redirects one after the other.

The invention is claimed is:

1. A method to redirect calls in a telecommunications network, the telecommunications network has a switching server to provide call redirects to other locations in the telecommunications network and has an administration server to administer and control user services and network capacities in a data network, wherein an address for a call redirect is saved in the switching server or the administration server, comprising:

determining whether a call has arrived for a subscriber through the switching server;

transmitting an address of the subscriber to the administration server;

checking, with aid of the administration server, whether a terminal device is signed on to the subscriber address;

transmitting results of the check from the administration server to the switching server; and redirecting the call to a prescribed address through the switching server if the administration server transmits the result that no terminal device is signed on to the subscriber address.

2. The method of redirecting calls in the telecommunications network according to claim 1, wherein the data network is a network with packet switching.

3. The method of redirecting calls in the telecommunications network according to claim 1, wherein the address for the call redirect is transmitted from the administration server to the switching server together with the result of the check, or is read out from a storage space on the switching server.

4. The method of redirecting calls in the telecommunications network according to claim 1, wherein the switching server does not execute a call redirect if a maximum number of call redirects to be performed in series is exceeded.

5. The method of redirecting calls according to claim 1, wherein the data network is a Local Area Network.

6. The method of redirecting calls according to claim 1, wherein the data network is the Internet.

7. A telecommunications network, comprising:

a data network to which a subscriber has access if a terminal device of the subscriber is signed on thereto;

a voice network configured for voice transmission to which the subscriber has access through the data network;

a switching server of the voice network that provides call redirects to other locations in the telecommunications network; and an administration server that administers and controls user services and network capacities in the data network, wherein at least one address for a call redirect is saved in the switching server or the administration server for the subscriber, the switching server is configured to perform a query of the administration server when the subscriber is called from the voice network to determine whether the terminal device of the subscriber is signed on to the data network, and the switching server executes a call redirect to the stored address when, as a result of the query of the administration server, a no sign-on is transmitted.

8. The telecommunications network according to claim 7, wherein the data network is a network with packet switching.

9. The telecommunications network according to claim 7, wherein the address for a call redirect is stored in the administration server of the data network and the administration server transmits the address to the switching server with a result of the query to determine if the terminal device of the subscriber is singed on to the data network.

10. The telecommunications network according to claim 7, wherein the switching server stores a maximum number of call redirects to be carried out in series.

11. The telecommunications network according to claim 7, wherein the data network, which is configured as a packet network, is the Internet and the administration server is a gatekeeper.

12. The telecommunications network according to claim 7, wherein the telecommunications network, which is configured as a packet network, is a Local Area Network and the administration server is a gatekeeper.

* * * * *